INVENTOR
CLARENCE R. MANNING
BY
Dewey J. Cunningham
ATTORNEY

INVENTOR
CLARENCE R. MANNING

BY Dewey J. Cunningham
ATTORNEY

Nov. 26, 1957 C. R. MANNING 2,814,438

PIN CONTACT FEED

Filed May 25, 1953 5 Sheets-Sheet 3

INVENTOR
CLARENCE R. MANNING

BY Dewey J. Cunningham
ATTORNEY

INVENTOR
CLARENCE R. MANNING
BY
Dewey J. Cunningham
ATTORNEY

INVENTOR
CLARENCE R. MANNING

BY Dewey J. Cunningham
ATTORNEY 2,814,438

PIN CONTACT FEED

Clarence R. Manning, Vestal, N. Y., assignor to International Business Machines Corporation, New York, N. Y., a corporation of New York Application May 25, 1953, Serial No. 357,199

1 Claim. (Cl. 235—61.6)

This invention relates to record sensing machines, particularly to that type used for sensing a record such as a punched card containing information in one code and providing output signals in the same or a different code.

An object of the present invention is to provide improved record sensing means which statically reads the information in a record card and generates differentially timed output signals of a predetermined character in relation to the information in said record card.

Another object of the invention is to provide improved means for statically sensing a record card having coded information punched therein and supplying output signals corresponding to said information in a different code.

Still another object of the invention is to provide improved means for sensing record cards statically wherein a class selection indication on the record card may be sensed to set up certain predetermined conditions in a card punch and then the class selection indication may be reproduced in a card by said card punch, the class selection and reproducing being performed during the same card feed cycle.

Other objects of the invention will be pointed out in the following description and claims and illustrated in the accompanying drawings, which disclose, by way of examples, the principle of the invention and the best mode, which has been contemplated, of applying that principle.

In the drawings.

Similar reference characters illustrate the same parts throughout the several views.

Figure 1:
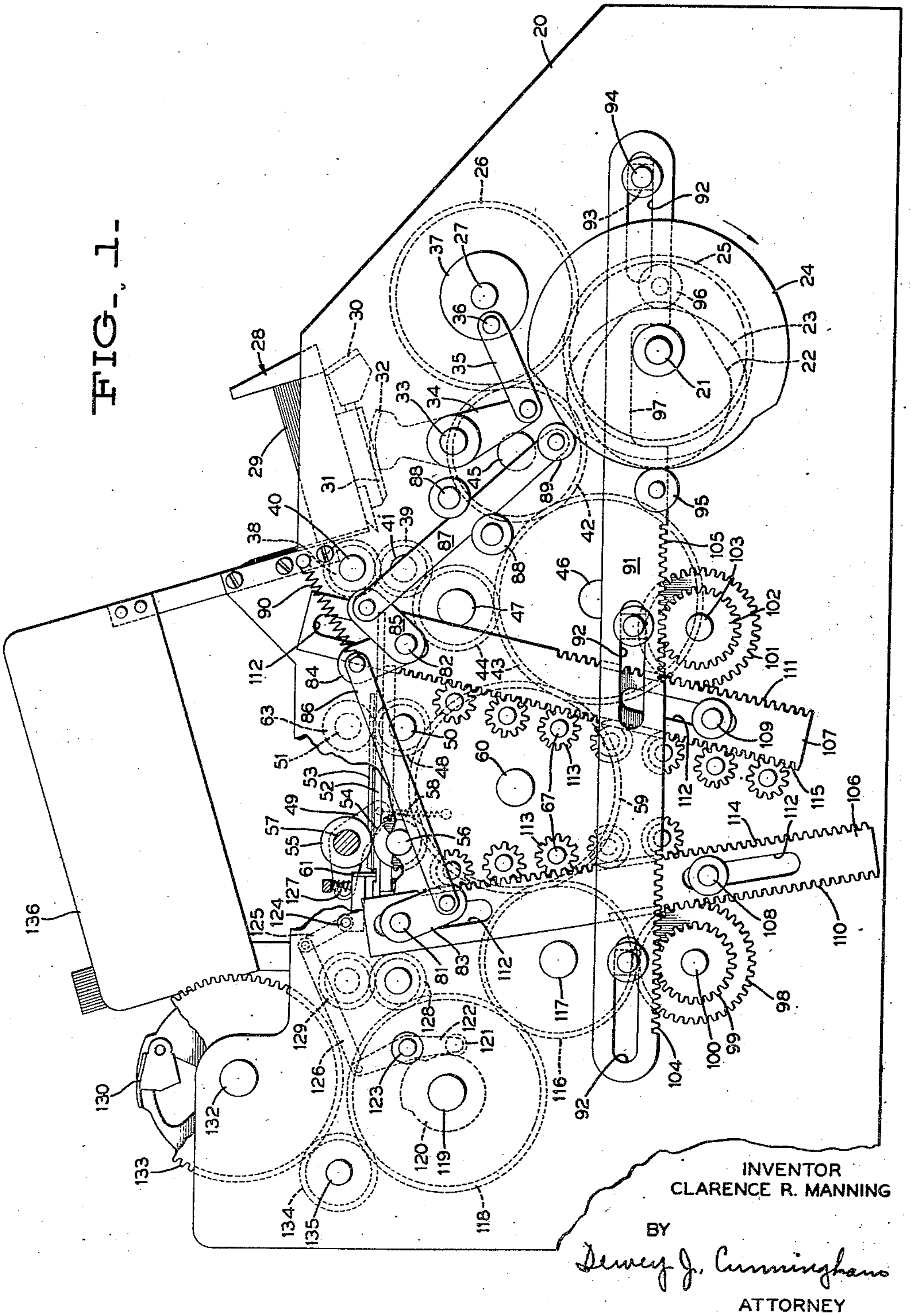
Fig. 1 is a side elevation of the present invention with portions thereof broken away to disclose more clearly the structure involved.

At the present time when it is desired to sense information in one code from a card and reproduce the information in a different code in another card, it is necessary to first sense the card containing the information to energize relay storage means, the output of which is wired to produce signals in a different code. The cost of such a device is considerable due to the large number of relays involved and is not altogether reliable. Mechanical means have been devised using permutation bars which are moved by information in a card being sensed to provide an output signal in a different code. However, such a device lacks flexibility in converting from one code to a plurality of codes.

The present invention has been developed to statically sense a record card which is punched in a code such as the well-known twelve hole IBM code and to furnish differentially timed output signals which may be used to operate a punch to reduce the information to another card in a different code, such as a binary code. This is accomplished by providing a pin contact feed mechanism for statically sensing the card already punched. A sensing pin is provided for each hole which may be found in the card, said sensing pin being slidably mounted so that when a hole is sensed in the card a portion of the pin moves into the hole and operates a contact member. The contact member is adapted to engage a rotating contact tube whenever a hole is sensed. A tube is provided for each row of holes which may be found in the card. One or more contact segments are provided on the surface of the tubes extending the length thereof. The number of armatures on each tube depends upon the code into which the information is to be converted. An electric circuit is completed upon the closing of each contact so as to provide an output signal. The output signals may be utilized in a conventional manner to operate the punch magnets of a punch.

The pin contact feed mechanism of the present invention includes a frame means having parallel side members 20, only one of which is shown. A plurality of driving and driven means are journaled in said side members and positioned therebetween. The primary drive source is through shaft 21 which is journaled in said side members. A plurality of cams, illustrated by reference characters 22, 23 and 24 are fixedly mounted on shaft 21 for rotation therewith, cams 22 and 23 being mounted between said side members while cam 24 is outside thereof.

A hopper 28 is secured to said side members and is adapted to have a plurality of stacked cards 29 placed therein. A conventional picker knife 30 is slidably mounted beneath said hopper. A rack gear 31 is mounted on the lower portion of said hopper for engagement with a sector gear 32 which is fixed to a shaft 33 journaled in the frame side members. A crank arm 34 is fixed to the last named shaft, the outer end of said crank being connected through a link 35 to a pin 36 which is eccentrically mounted on a rotating member 37 fixed to shaft 27. Rotation is imparted to shaft 27 through gears 25 and 26 which are fixed to shafts 21 and 27, respectively. Therefore, rotation of gear 25 on the primary drive shaft rotates gear 26 and member 37. As member 37 rotates a rocking motion is imparted to sector gear 32 through link 35 and crank 34.

As the picker knife reciprocates a card is fed to a pair of feed rolls (not shown) which are rotated by meshing gears 38 and 39 mounted on shafts 40 and 41, respectively, said shafts being journaled on said frame side members. The drive for gears 38 and 39 is from the main drive shaft 21 through meshing gears 25, 26, 42, 43 and 44 mounted on shafts 21, 27, 45, 46 and 47, respectively, all of said shafts being journaled in the frame side members.

Figures 2, 3:
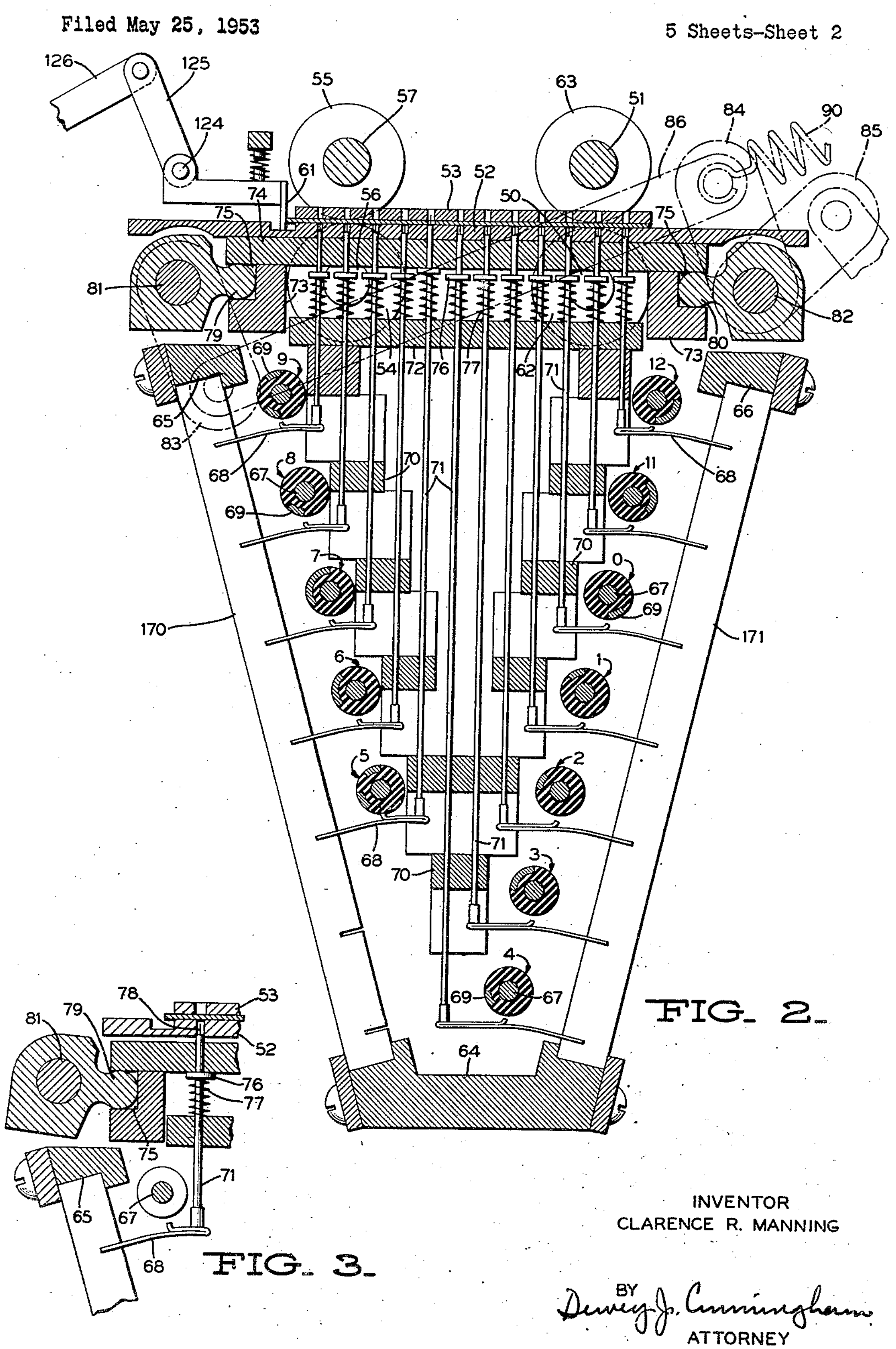
Fig. 2 is a sectional view of the invention showing the sensing station in detail.
Fig. 3 is an enlarged view of a portion of Fig. 2.

Referring to Figs. 1 and 2, the card is fed from the aforementioned feed rolls between upper and lower guide plates 52 and 53, respectively, to a pair of skid rolls 62 and 63 which are mounted on shafts 50 and 51, respectively. A second pair of skid rolls 54 and 55 are mounted ahead of the aforementioned skid rolls on shafts 56 and 57, respectively. Shafts 50 and 56 are journaled in the side frame members 20. Drive gears 48 and 58 are associated with shafts 50 and 56, respectively, and are mounted to mesh with drive gear 59. As shown in Fig. 1, shaft 57 is mounted intermediate the ends of bell crank 49, the upper end of the bell crank being pivotally mounted to the frame and the lower end being resiliently biased so that roll 55 is urged against roll 54. A similar bell crank arrangement is provided for roll 63. Gear 59 is mounted on shaft 60 which is journaled in the frame side members. As the card is pulled forward between the guide plates by the skid rolls, the forward end thereof engages a card stop member 61. The skid rolls urge the card to maintain its engagement with the stop member. However, due to the resilient mounting of rolls 55 and 63 surfaces will slip on the card until stop 61 is lifted.

The pin sensing unit for one column of the card is shown in detail in Fig. 2, it being understood that additional pin sensing units may be provided for sensing the card holes in additional columns.

A pair of angularly related frame members 170 and 171 are connected at their lower ends by a base 64 which extends perpendicularly of side members 20 and is secured thereto. Frame members 65 and 66 also extend perpendicular to said side members and are connected thereto. The upper ends of frame members 170 and 171 are connected to members 65 and 66, respectively. A plurality of contact tubes, having reference characters 12, 11, 0, 1, 2, 3, 4, 5, 6, 7, 8 and 9 applied thereto, are mounted on shafts 67. The reference characters applied to said tubes are in accordance with the index point position of the particular hole in the card which is to be sensed thereby. It will be noted that a spring contact 68 is associated with each of said contact tubes, one end of said spring contact being secured to the frame while the other end is adapted to engage the surface of the contact tube. The tubes are generally constructed of an insulating material but the surfaces thereof are provided with one or more commutator segments illustrated by reference character 69.

A plurality of apertured guide members 70 are arranged to extend between side members 20 and are secured thereto, the apertures in said guide members being adapted to slidably receive a plurality of pins 71. A pin guide plate 72 is mounted above members 70 and is apertured to slidably receive said pins. Plate 72 extends between frame members 20 and is secured thereto. A pair of L-shaped carriage members 73 and a bail 74 are mounted between the side members 20, said bail extending over the tops of said L-shaped members to form a groove 75. The bail is connected to the carriage members for movement therewith and is additionally provided with a plurality of apertures for slidably receiving the pin members.

As shown in Fig. 3, a flange 76 is secured to the pin adjacent the bail. A coil spring 77 encircles said pin, the ends of said springs engaging flange 76 and the pin guide plate 72.

The upper ends of pins 71 are provided with a hole sensing wire 78, the diameter of said wire being considerably less than the diameter of said pin for registering with ease in the record card holes, even though the card may be slightly misaligned. The lower card guide plate 52 is apertured to receive the sensing pins 70. Apertures are also provided in the upper card guide plate 53 for receiving the sensing wires 78 whenever said wires are in register with a hole in the card.

Drive means are provided for rotating the contact tubes and reciprocating bail 74 in an up and down manner. With the contact tubes rotating and the bail in its upper position, only a pin whose wire sensing means registers with an aperture in the card will be pushed upwardly by springs 77. As a pin moves upwardly the contact 68 associated therewith engages the surfaces of the contact tube with which it is operatively associated. For example, as seen in Fig. 2, a pin is in register with a hole in the card so that the contact 68 can engage the surface of contact tube 5. As tube 5 is rotated the engagement of the contact with commutator segments 69 thereon completes an electric circuit.

The linkage for reciprocating bail 74 vertically will now be described. From Figs. 2 and 3 it will be seen that lugs 79 and 80 are mounted in grooves 75, said lugs being secured to shafts 81 and 82, respectively, which are journaled in side frame member 20. A link 83 is fixed to shaft 81 for rotation therewith. Similar links 84 and 85 are fixed to shaft 82, said links being angularly related to each other by an acute angle. The free ends of links 83 and 84 are pivotally connected to link 86. A link 87, as shown in Fig. 1, has one end thereof pivotally connected to the free end of link 85 and is slidably guided by a pair of bolts 88 secured to the side frame members. At the other end of link 87 there is provided a cam follower roller 89 adapted to ride on cam 24.

As cam 24 is rotated by the primary drive, link 87 is reciprocated, thus rocking links 85, 84 and 83. As the latter links are rocked lugs 79 and 80 are moved up and down, thus reciprocating bail 74. To assure that roller 89 follows cam 24, a spring 90 is secured to the free end of link 84 and the side frame member. As the bail is pulled down all pins are pulled down to permit a card to enter between the upper and lower plates. After the card has entered the bail is moved upwardly to permit the sensing wires to be received by whatever holes are provided in the card.

The drive for the contact tubes will now be described in detail. The tubes are actually rotated in one direction a predetermined number of degrees and then the direction of rotation is reversed. As shown in Fig. 1, a reciprocating bar 91 is furnished with elongated slots 92, said slots slidably receiving blocks 93 secured to side member 20 through a rod 94. Rollers 95 and 96 are mounted in spaced relation on bar 91 and act as the cam followers for cams 22 and 23, respectively. That is, cam 22 causes the bar to move positively in one direction while cam 23 causes the bar to move positively in the other direction. Bar 91 is undercut as at 97 to permit the bar to operate over the cam hubs.

Spur gears 98 and 99 are fixedly mounted on shaft 100 which is journaled in side frame 20. In spaced relation to the last named gears, spur gears 101 and 102 are fixedly mounted on shaft 103 which is journaled in the side frame. Bar 91 is furnished with rack gears 104 and 105 which mesh with gears 99 and 102, respectively. Thus, as bar 91 is reciprocated, the gears rotate in first one direction and then the other.

A pair of angularly related bars 106 and 107 are mounted on frame 20 to extend in a generally vertical direction. Each bar is slotted as at 112. Slots 112 in bar 106 slidably receive shaft 81 and rod 108 while slots 112 in bar 107 slidably receive shaft 82 and rod 109. Rods 108 and 109 are mounted in the side frame members. Rack gears 110 and 111 are provided on bars 106 and 107, respectively, for meshing with spur gears 98 and 101, respectively.

Each of shafts 67 upon which the contact tubes are mounted has a spur gear 113 fixedly mounted thereon which meshes with rack gears 114 and 115 on bars 106 and 107, respectively.

Therefore, as bar 91 is reciprocated spur gears 99 and 102 are rotated. This causes gears 98 and 101 to rotate in a manner to reciprocate bars 106 and 107. The reciprocation of the last named bars causes rotation of the contact tubes in first one direction and then the other.

After the card has been sensed the stop 61 is lifted to permit the card to be removed and stacked. A gear 116, which meshes with gear 59 to be driven thereby, is mounted on a shaft 117 which is journaled in the side frame members. A gear 118 is mounted on a shaft 119 which is also journaled in the side frame members. Shaft 119 also has a cam 120 secured thereto. A cam follower 121 is secured to one end of bell crank 122, said bell crank being pivotally mounted by shaft 123 in side frame members 20. The card stop member 61 is secured to a shaft 124 which is journaled in side frame. A link 125 has one end thereof secured to shaft 124, the other end and one end of crank 122 being pivotally connected through a link 126.

The arrangement is such that when cam follower 121 rides on the high dwell of cam 120 stop 61 is raised to permit the skid rollers to pass the sensed cards thereunder. A spring 127 biases stop 61 to a down position at all times except when raised by cam 120.

The card is passed from the skid rolls to a pair of rolls (not shown) which are driven by meshing gears 128 and 129, gear 128 meshing iwth gear 118 to be driven thereby. The card is then adapted to pass through appropriate guide means (not shown) to a position where it may be picked up by gripper finger 130 on stacker drum 131. The stacker drum is mounted on a shaft 132 which is journaled in the side frame. A gear 133 is also mounted on the shaft and is adapted to be driven by gear 134 which meshes with gear 118, gear 134 being mounted on a shaft 135 which is journaled in the side frame. The cards are then deposited in stacker box 136 in the usual manner. The last named guide means, the stacker drum and their relationship to the stacker box have not been described in detail since they are conventional. For further information with regard to the details thereof reference may be made to Patent No. 1,827,259, issued to J. R. Peirce on October 13, 1931, for Card Feeding Mechanism.

*Wiring diagram*

Figure 5:
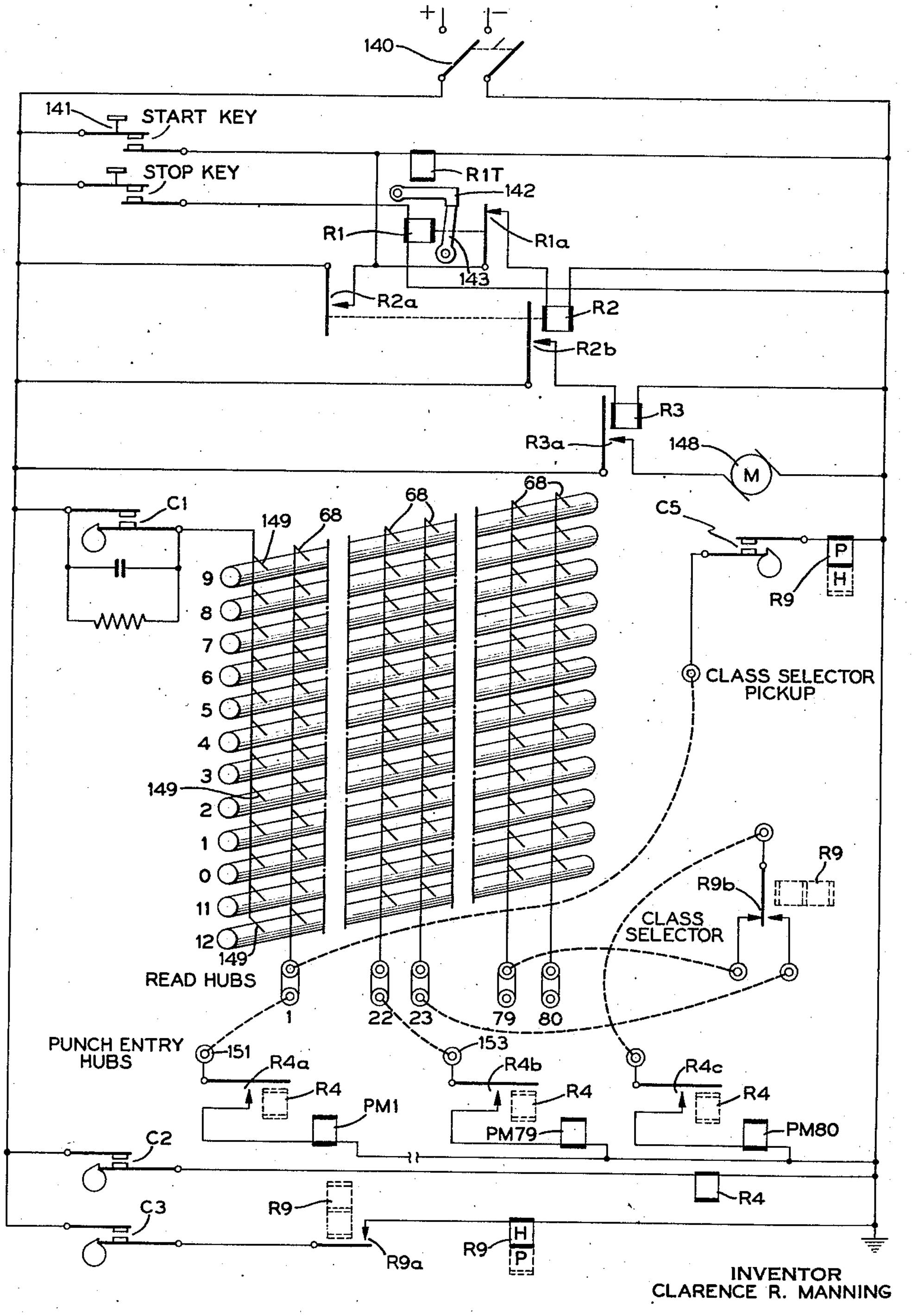
Fig. 5 is a diagram showing schematically certain mechanical features and the electrical circuitry associated therewith.

Fig. 5 shows a schematic diagram of the control circuit for the instant invention. A main switch 140 is utilized to connect the circuit to the power supply. A start key 141 is connected to the high side of the line so that when the circuit is closed by said key the pivoted armature 142 of trip magnet RIT is pulled toward the magnet releasing the pivoted latch arm 143 which is connected to relay R1. The relay is allowed to return to its normal position so that contact R1*a* is now closed. The closing of contact R1*a* completes a circuit from the + side of the line, through the start key contact, contact R1*a*, coil of relay R2, to the — side of the line, energizing relay R2, which closes contacts R2*a* and R2*b*. The closing of contact R2*a* supplied power through contact R1*a* to hold the circuit in operation so that the start key can now be released. The closing of contact R2*b* energizes relay R3 which closes contact R3*a* to supply power to motor 148, which starts the machine in operation. This motor drives shaft 21 as shown in Fig. 1.

Power is supplied to the contact tubes through the main circuit breaker C1 and a plurality of contacts, one contact being provided for each tube. The contacts are illustrated schematically and are designated by reference numeral 149. Tube contacts 68 are also shown schematically in Fig. 5. While there have been shown only the tube contacts and associated read hubs for card columns 1, 22, 23, 79 and 80, it will be understood that this is done only for simplicity since the actual machine may be provided with contacts and read hubs for all columns of the card which are to be sensed.

Figure 4:
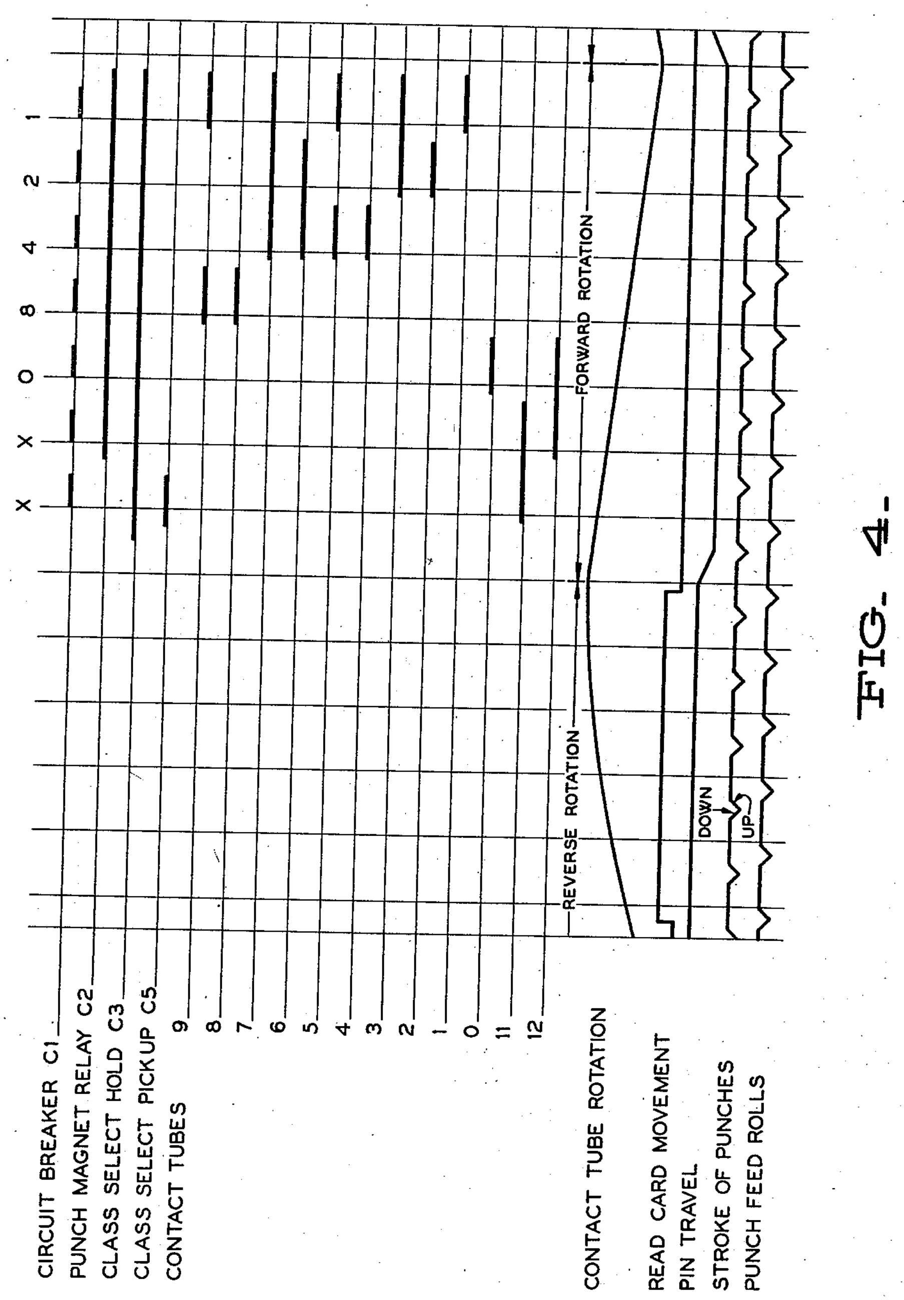
Fig. 4 is a timing chart showing the manner in which the instant invention can sense a punched card in one code and supply output signals in a different code.

Punch entry hubs are shown only for the control of punch magnets PM1, PM79 and PM80, it being understood that the entire machine includes a punch magnet for each column of the card being sensed. Each punch magnet can be connected to a related punch entry hub, such as 151 or 153, through a normally open contact, such as R4*a*, of a relay R4. Relay R4 is energized by an obvious circuit extending through cam contact C2, throughout the punching time of the cycle (Fig. 4). A typical circuit to a punch magnet, on reading a "5" hole in the card, for example, extends from the + side of the line, through cam contact C1, contact 149 pertaining to the "5" contact tube, commutator segment 69 of said contact tube, hole in the card, contact 68 for column 1 and contact tube "5," read hub for column 22, plug wire 200, punch entry hub 153, relay contact R4*b*, punch magnet PM79, — side of the line.

Fig. 4 shows a timing chart for the present invention. As shown, the chart is divided into fourteen intervals. Pins 71 begin their withdrawal just after sensing ends and stay withdrawn until a new card is in position to be sensed. The contact tubes 9, 8, 7, 6, 5, 4, 3, 2, 1, 0, 11 and 12 begin their forward movement after the card is in place and the pins are released to engage the card. At this time sensing may begin.

In the example just described, with a "5" hole in column 22, a circuit will be completed to punch magnet PM79 at "4" time and again at "1" time, as shown by the timing chart, and the card in the punch section of the machine will be punched with a 4, 1 combination.

Provision may be made for class selection prior to the punching operation. For example, a perforation may be provided at the "11" index point position in column 1 of the card being sensed. Just after the commutator tubes begin their forward rotation the class select hold circuit breaker C3 makes. Immediately thereafter the class select pickup circuit breaker C5 makes. When the circuit breaker C1 makes at the first "*x*" cycle point a circuit is made from the high side of the line through C1, contacts 149, commutator tube 11, contact 68 associated with tube 11, read hub 1, plug wire 201, C5, and the pickup portion of relay R9, to the low side of the line. When relay R9 is energized contact R9*b* thereof is transferred from the position shown in Fig. 5. Also, contact R9*a* closes to energize the hold portion of relay R9.

It will be seen that the wiring is such that the information sensed in column 23 of the card will now be fed through the class selector to contact R4*c* and PM80. Without the aforementioned class selection the information from column 79 would have been supplied through the class selector to contact R4c and PM80.

It should be noted that the commutator for tube 11 is connected to the high side of the line during both the first and second "*x*" cycle points. Read hub 1 is connected to punch entry hub 151. During the second "*x*" cycle point this information is supplied from punch entry hub 1 through contact R4*a* to magnet PM1. Thus, the class select information is placed in the card being punched. In this manner class selection may take place before the punching operation begins and thereafter the card can be punched with the "*x*" hole for class selection, along with the remainder of the information in the card being sensed.

While the details of the punch mechanism have not been shown it will be understood that the card to be punched is fed so that a predetermined row of holes may be punched as the card is successively fed a row at a time to the punches. With slight modification the punch shown in patent, No. 2,531,873, granted to G. F. Daly on November 28, 1950, could be utilized with the present invention.

Figure 6:
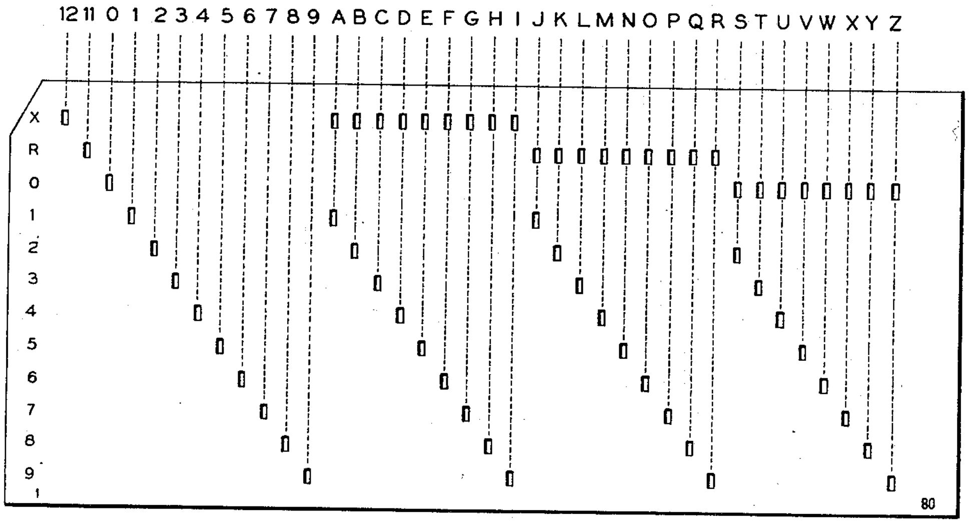
Fig. 6 shows a record card punched in one code with numeric and alphabetic characters, this card being the one which may be sensed by the present invention.
Figure 7:
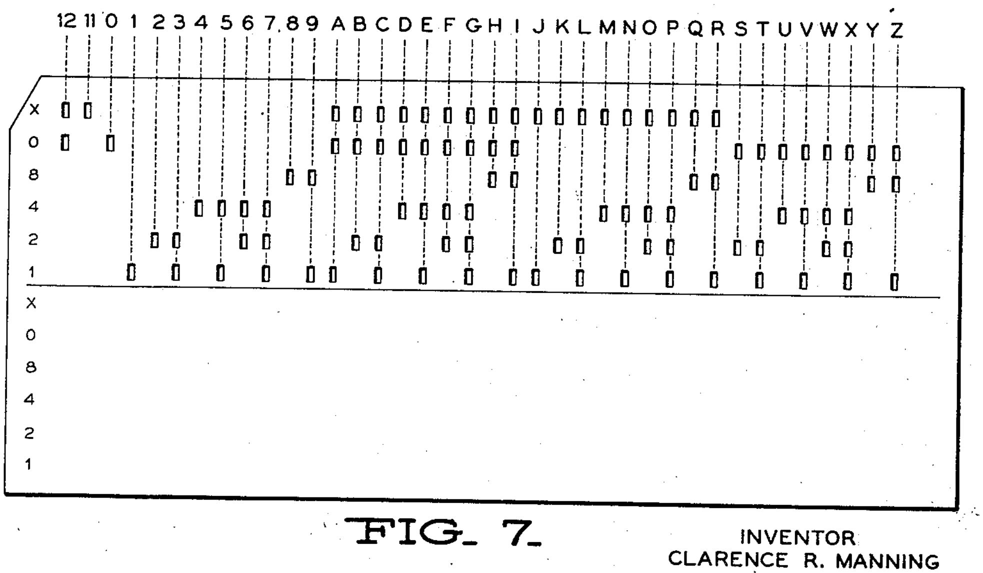
Fig. 7 shows a record card punched in a different code with numeric and alphabetic characters, this card being the one which may be punched as the card shown in Fig. 6 is sensed.

Figs. 6 and 7 have been included to show, by way of example, how the present invention may be utilized in translating. The conventional twelve hole IBM code is shown in a card in Fig. 6. This card may be sensed and cause the card shown in Fig. 7 to be punched.

In view of the above it will be seen that I have provided a record sensing device which may be used for sensing a card punched in one code and provide output signals to punch a second card in the same or a different code. The device has considerable flexibility and is reliable in operation.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claim.

What is claimed is:

In a perforated record sensing apparatus having a sensing station, means for feeding a record having perforations indicating class select information and detailed information therein to said sensing station, a plurality of sensing pins, said sensing pins being mounted to register with perforations in said record, rotatable commutator means having conducting segments associated with each of said sensing pins, each of said pins having an individual commutator means, contact means for each of said commutator means, said contact means being adapted to engage and disengage the commutator means and the segments of said commutator means under the control of the sensing pin associated with the commutator means, and means for rotating said commutator means through a sensing cycle, said commutator means having the segments thereof arranged to supply an output signal indicative of the class select information and thereafter supply differentially timed output signals of predetermined character in relation to the class select information and the detailed information in the record being sensed, all of said output signals being supplied during a single sensing cycle.

References Cited in the file of this patent

UNITED STATES PATENTS

| | | |
|---|---|---|
| 1,894,980 | Creed et al. | Jan. 24, 1933 |
| 1,926,882 | Peirce | Sept. 12, 1933 |
| 2,343,405 | Doty | Mar. 7, 1944 |
| 2,404,339 | Zenner | July 16, 1946 |